United States Patent Office 3,032,368
Patented May 1, 1962

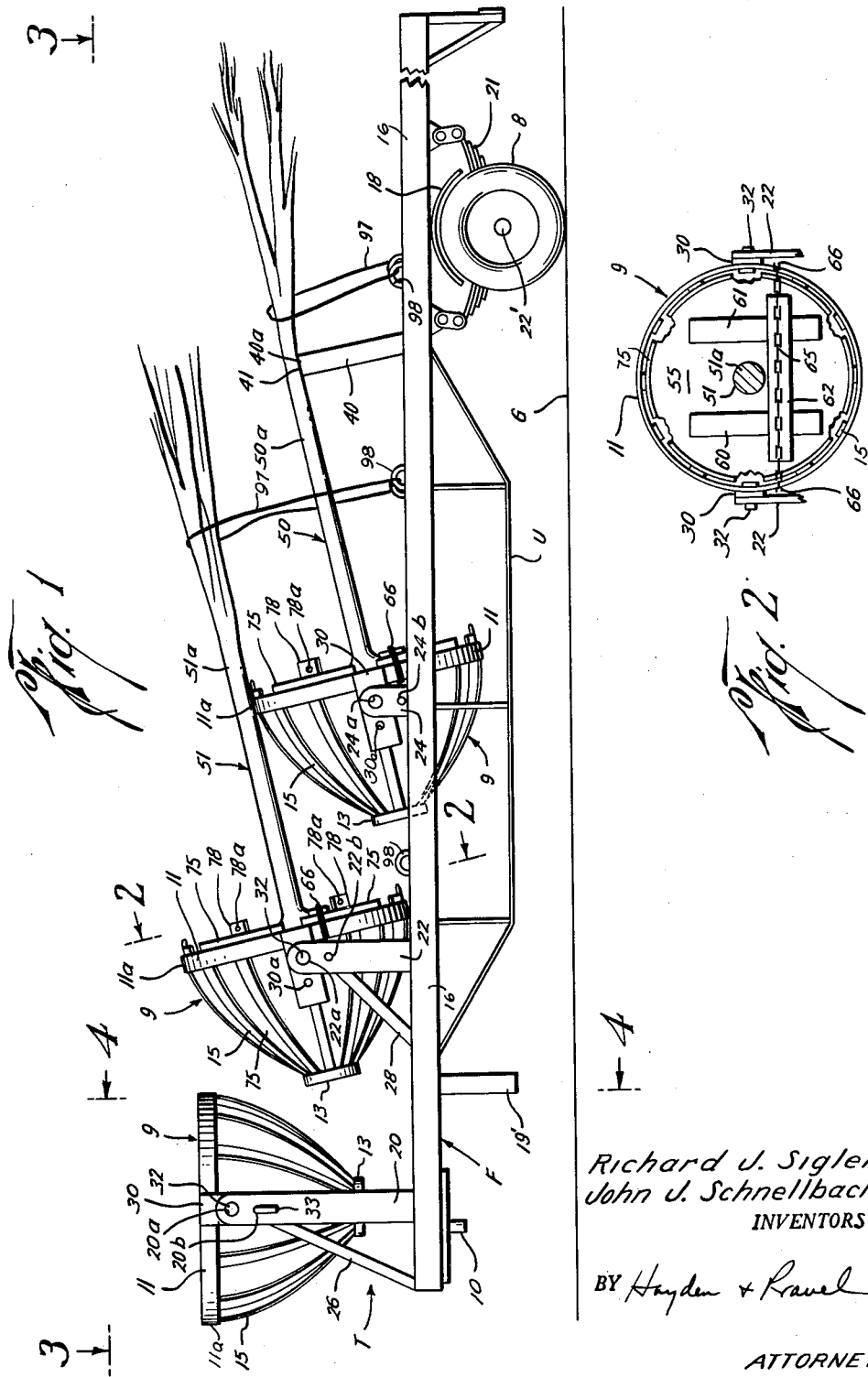

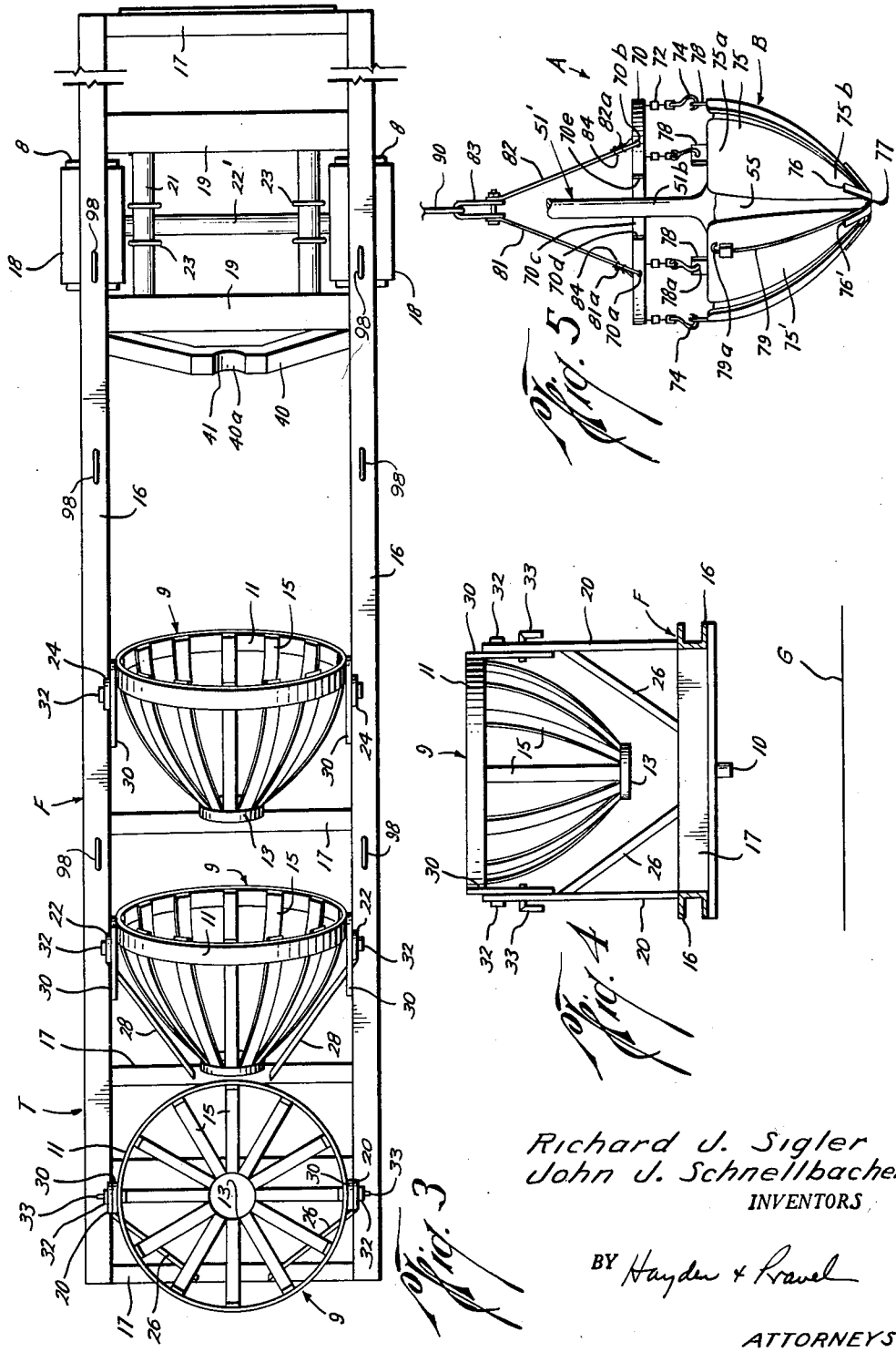

3,032,368
TREE FLOAT OR TRAILER
Richard J. Sigler and John J. Schnellbacher, Houston,
Tex., assignors, by mesne assignments, to Reed Roller
Bit Company, Houston, Tex., a corporation of Texas
Filed Sept. 24, 1959, Ser. No. 842,058
8 Claims. (Cl. 296—3)

The present invention relates to a new and improved apparatus for transporting trees or similar objects and more particularly to an apparatus for moving relatively large trees.

An object of the present invention is to provide a new and improved means for transporting one or more trees or similar objects from one location to another.

Another object of the present invention is to provide a new and improved tree float or trailer for transporting relatively large trees beyond the immediate vicinity of the area from which the trees were excavated.

Still another object of the present invention is to provide a new and improved tree float or trailer for moving trees having a plurality of receptacles thereon for supporting a plurality of sections of earth, trees, or other similar objects.

A further object of the present invention is to provide a new and improved tree float or trailer adapted to be used with the apparatus for moving trees, earth or other objects in copending patent application, Serial No. 833,565, filed August 13, 1959.

A still further object of the present invention is to provide a new and improved means for moving trees without damaging or injuring the trees.

An important object of the present invention is to provide a new and improved carrier for transporting a tree, or a plurality of trees in a substantially horizontal position, wherein such tree or trees and trailer may be moved throughout the streets of a city without interfering with light wires, telephone lines, bridges, underpasses, tunnels, or other normal constructions.

Another important object of the present invention is to provide a new and improved apparatus for moving trees wherein each of the trees is supported at its base so as to avoid the necessity for lifting a tree by its trunk.

Still another object of the present invention is to provide a new and improved apparatus for moving trees, sections of earth thereunder, and roots therein wherein the necessity of balling and burlapping the trees has been obviated.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIG. 1 is a side elevation of the invention illustrating the receptacles thereof, some of which are in a loaded position and one of which is in an empty position;

FIG. 2 is a view taken along lines 2—2 in FIG. 1 illustrating the retaining means on one of the loaded receptacles;

FIG. 3 is a plan view taken along line 3—3 in FIG. 1 and illustrates the containers when they are all empty;

FIG. 4 is a view partly in elevation and partly in section, taken along line 4—4 in FIG. 1; and FIG. 5 is an elevation of the preferred apparatus for loading the containers of FIGS. 1-4 with trees, sections of earth or similar objects.

In the drawings, the letter T generally indicates the tree float or trailer which includes a frame F supported at its rear end by a pair of double wheels 8 or any other suitable means of mobility and is supported at its front end by a truck or other suitable vehicle (not shown). The trailer T may be connected to a truck or vehicle (not shown) by any suitable means, such as a standard fifth wheel connector 10 of the type illustrated in FIG. 1. A plurality of receptacles 9 are positioned on the frame F in substantial longitudinal alignment and preferably stair-stepped from the front end of the trailer T for receiving the sections of earth or root-balls of trees. Normally, each section of earth or each root-ball is positioned in a container B of an apparatus A (FIG. 5) prior to positioning same in the receptacle 9, as will be more fully explained. Also, as will be more evident hereinafter, the receptacles 9 are so mounted on the frame F that they are adapted to receive the containers B when the receptacles 9 are in a substantially vertical position and thereafter the receptacles are adapted to be pivoted to an inclined or substantially horizontal position for transporting the trees or similar objects in the containers B.

In the preferred embodiment of the present invention, each of the receptacles 9 is comprised of a relatively large ring or continuous member 11 which is attached or connected to a smaller ring 13 by a plurality of circumferentially spaced longitudinally curved members 15 by welding or other suitable means. The members 15 are preferably spaced equidistantly from each other. As the receptacles 9 are normally used to hold relatively large trees, the rings 11 and 13 and the members 15 should be of heavy gauge metal such as steel.

The frame F includes a pair of relatively long parallel members 16 with suitable cross-members 17 connected thereto. For supporting the rear of the trailer T off the ground G a pair of double wheels 8 are attached to the frame F by any standard means, an example of which is shown in the drawings wherein cross-members 19 are attached to the longitudinal members 16 of the frame F for suspending a pair of leaf springs 21 therefrom. The pair of double wheels 8 are mounted on an axle 22' which is connected to the pair of leaf springs 21 by a pair of U-bolts or shackles 23.

Fenders 18 are preferably attached to the underside of each of the members 16 over the double wheels 8 by any suitable means, such as welding.

A frame support member 19' is attached to the underside of the forward portion of the frame F for supporting the front end of the trailer T, when the trailer T is not connected to a truck or other similar means.

An undercarriage U is vertically attached to the underside of each of the frame members 16 of the frame F sufficiently high above the ground G to maintain adequate road clearance when the frame F is in substantially horizontal position. Such undercarriage U serves to protect the lowermost receptacle 9 from damage as a result of bumps or other similar road hazards.

Extending vertically on the longitudinal members 16 of the frame F are a plurality of pairs of receptacle support members 20, 22 and 24, each pair successively shorter than the first, or in stairstepped relationship. To give additional rigidity and support to the taller receptacle support members 20 and 22, angular support members 26 and 28 are connected to such vertical support members 20 and 22, respectively and extend downwardly and inwardly therefrom.

On the sides of each of the receptacles 9 are attached a pair of longitudinal pivot plates 30 so that when each receptacle 9 is in a vertical position, the pivot plates 30 are aligned with the pair of the vertical support members 20, 22, or 24 adjacent thereto. Such members 30 are attached to each of the receptacles 9 by welding or other suitable means.

On the upper portion of each of the members 20, 22 and 24 are the openings 20a, 22a and 24a, respectively. Each plate 30 has a pivot pin 32 thereon which is inserted or extended through each of the openings 20a, 22a and 24a to provide for pivotal movement of the receptacles 9. Each of the receptacles 9 preferably is so constructed that the upper portion or the portion of the receptacle 9 above the pivot pin 32 is heavier than the lower portion thereof which causes the receptacle 9 to pivot from the upright postion (see receptacle 9 at the left in FIG. 1) to an inverted position, the purpose of which will be explained hereinafter.

Each of the members 30 has a lock hole 30a therein below the pivot pin 32. Corresponding openings 20b, 22b and 24b are positioned on the vertical support members 20, 22 and 24, respectively, so that such openings are aligned with the lock holes 30a in the adjacent plates 30 when the receptacles 9 are in the vertical or upright position. In order to retain the receptacles 9 in a vertical position so that trees, sections of earth, and roots therein or other similar objects may be positioned in such receptacles 9 or removed therefrom, a locking or retaining pin 33 is inserted through the openings 20b, 22b and 24b and through the adjacent openings 30a on the plates 30. Thus the locking pins 33 with each receptacle 9 serve to hold the receptacle 9 in a vertical or upright position so that trees, sections of earth and the roots therewith may be positioned in such receptacle 9. In some instances, only one locking pin 33 is used with each receptacle 9 instead of the pair of pins 33 shown.

A tree support or rest 40 is positioned between the longitudinal member 16 of the frame F on the latter portion of the trailer T. Such rest 40 extends angularly upwardly and inwardly so that the center portion 40a of the rest 40 is concave so as to receive the trunk 50a of the tree 50 positioned in the lower receptacle 9 (the receptacle on the right in FIG. 1). Suitable padding 41 may be placed on the center portion 40a of the support 40 for protection of the trunk 50a of the tree 50 supported thereon.

To substantially retain the section of earth 55 in the receptacles 9 when such receptacles are pivoted to an inclined or substantially horizontal position, as best seen in FIG. 1, a pair of rigid strip members 60 and 61 are placed on top of the section of earth 55, on either side of the trunk 51a of the tree 51, and parallel to each other (see FIG. 2). A third strip member 62, similar to the members 60 and 61, is placed on top of each of the members 60 and 61 and below or underneath the trunk 51a of the tree 51 when the tree 51 is in the inclined or substantially horizontal position. A chain 65 or other suitable flexible member which may be easily tightened is placed over the member 62 and connected or attached to either side of the receptacle 9 by means of a clamp 66 or other suitable means. The chain 65 may be tightened by means of a standard chain tightener (not shown) well known in the art.

Referring now to FIG. 1 of the drawings, the two receptacles 9, on the right, are shown in loaded position for transporting the trees 51 and 50, respectively. Each tree is initially loaded into a receptacle 9 when in an upright position and so that the trunk is in approximately the center of such receptacle. Generally, the lowermost receptacle 9 is loaded first so that after the tree 50 has been positioned in such lowermost receptacle 9, it is pivoted or swung to the position shown in FIG. 1 wherein the trunk 50a of the tree 50 is supported on the rest 40. The tree 51 positioned in the center receptacle 9 is likewise pivoted to the position seen in FIG. 1 wherein the trunk 51a of the tree 51 rests on the portion 11a of the receptacle ring 11 of the lowermost receptacle 9, when the lowermost receptacle 9 is in a near horizontal position. The trees 51 and 50 are thus carried in position wherein they are approximately parallel to each other. Similarly, if a third tree were placed in the uppermost receptacle 9, such receptacle would be swung to a near horizontal position 11a of the receptacle ring 11 of the center or middle receptacle 9. This third tree would also then be approximately parallel to the other two trees. Suitable padding may be placed over the portions 11a of the two lowermost containers for protection of the trunks of the trees when resting thereon.

This stairstepped arrangement of the receptacles combined with their pivotal action permits several trees of relatively large lengths (e.g. 30–50 feet) to be transported over long distances over city streets or country roads without interferring with light wires, telephone lines, bridges, underpasses, tunnels and other similar objects.

This arrangement of the trees, with the lowermost tree supported on the tree rest 40 and each successively higher tree supported on the receptacle ring 11 on its right, as explained above, allows sufficient area above the frame and above each successively higher tree for the foliage on the trees without damaging such foliage. In the case of trees with relatively large amounts of foliage some trimming of such foliage may be necessary.

Normally, in loading the tree float or trailer T with trees, such trees would already be positioned in an apparatus A (FIG. 5) of the type illustrated in the preferred embodiment of the apparatus described in copending application, Serial No. 833,565, filed August 13, 1959.

The apparatus A consists of a large partial ring 70 from which chains 72 or other suitable flexible members are suspended equidistantly from the underside thereof. Hooks 74 are connected to the lower ends of each of the chains 72 which are also of equal lengths. A container or bucket B is suspended from the hooks 74.

The container B includes a plurality of curved segments 75 which are larger on their upper ends 72a than on their lower ends 75b. Each of the segments 75 is connected to a hook 74 by means of a member 78 positioned on the upper portion 75a of the segment 75. Each of the members 78 has a hole or opening 78a positioned therein for receiving the hook 74. Each of the lower ends 75b of the segment 75 has a loop or eye 76 attached thereon. On one of the segments 75', the "master" segment, a double cable 77 is attached thereto. The cable 77 is then extended or inserted through each of the loops 76 of the segment 75 so that the bight end of the cable 77 extends through the loop 76' of the segment 75'. A locking pin or rod 79, curved similarly to the segments 75 is positioned on the segments 75'. A bracket is positioned on the upper portion 75a of the segment 75' through which the rod 79 is inserted. The rod 79 has an enlarged head 79a which serves as a stop thus preventing the rod 79 from falling completely through the bracket 80. The rod 79 is also inserted in the bight end of the cable 77 extending through the loop 76 of the segment 75. The segments 75 are thus locked together and the container B is formed.

The apparatus A may be lifted and moved by means of any standard boom well known in the art. For this purpose a pair of cables 81 and 82 are suspended from a shackle 83 and connected to the ring 70 by extending the end portions 81a and 82a through the holes or openings 70a and 70b, respectively, and clamping or otherwise joining such cable ends 81a and 82a to the cables 81 and 82, respectively, as indicated at 84. The shackle 83 is suspended from a standard boom, a portion of which is shown at 90. The apparatus A as viewed in FIG. 5 has a tree 51' positioned in the container B. The section of earth 55' below the trunk 51b of the tree 51' is positioned in the container B in such a manner that the trunk 51b is in approximately the center of the container B. So that the container ring 70 may be laterally positioned around the tree 51', an opening 70c extends between each of the ends 70d and 70e of the partial ring 70.

In the preferred method of operation and use of the trailer T, a tree with a section of earth cut from beneath the trunk of such tree, and the roots therewith is placed in the apparatus A. With the receptacle 9 to be loaded in a vertical or upright position, the apparatus A with the tree therein is moved into position directly over the receptacle 9 to be loaded by means of a standard boom or other suitable means. Normally, the lowermost receptacle 9 is loaded first, after which each successively higher receptacle is loaded. The container B is then lowered into the receptacle 9 until the segments 75 come to rest therein and the chains 72 become slack. Each of the hooks 74 are released from the members 78 and the ring 70 is withdrawn from around the tree, thus leaving the container B, the tree, section of earth and the roots therein in the receptacle 9. During this phase of the operations the receptacle 9 is retained in its vertical position by means of the locking pin or pins 33 as described hereinabove.

After the receptacle 9 is loaded and while the receptacle 9 and tree therein are in an upright position, and in order that the tree, earth, and roots in the receptacle 9 will remain in the receptacle 9 when the receptacle 9 is pivoted downwardly, a pair of rigid strip members 60 and 61 are placed on top of the earth and on either side of the trunk approximately parallel to each other. A third rigid strip member 62 is placed over each of the members 60 and 61 and perpendicular thereto. A chain 65 is attached to either side of the ring 11 by means of clamps 66 and extended over the member 62 and parallel thereto. The chain 65 is then tightened by use of a chain tightener. The arrangement of the strip members 60, 61 and 62 and chain 65 is best viewed in FIG. 2.

A cable or line connected to a standard boom is then attached to the upper portion of the trunk. The locking pin or pins 33 are removed from the openings 22b and 30a which permit the receptacle 9 to pivot downwardly to near horizontal position. The line connected to the boom prevents the tree from pivoting too rapidly and thereby causing damage to such tree. The tree is thus eased downwardly until the trunk is supported or rests against the rest 40. U-bolts 98 are positioned along the frame member 16. A line 97 is connected to a U-bolt 98 on one frame member 16 and is passed over the tree 50 and then connected to a corresponding U-bolt 98 on the opposite frame member 16 so as to hold the tree 50 firmly against the tree support 40. The tree 50 is now in position for being transported to the desired location. Each of the remaining receptacles 9 has a tree placed therein in a manner similar to that described above. The tree in the uppermost receptacle 9 will rest on the portion 11a of the large ring 11 of the middle receptacle 9 when such receptacle 9 is pivoted to transporting or carrying position. The tree in the center receptacle 9 will in turn rest on the portion 11a of the large ring 11 of the lowermost receptacle 9, when such lowermost receptacle is swung to transporting position.

After the device is fully loaded or loaded as fully as desired the trees are transported to the desired location. Upon arriving at the location the loading process is reversed. The line 97 is released from one of the shackles 98 and removed from around the tree 50. A line is then positioned around the trunk 50a of the tree 50, which line is connected to a standard boom and the tree is then raised to a vertical position. After reaching a vertical position and aligning the holes 22b and 30a, the locking pins 33 are inserted therethrough, and the line or cable connected or attached to the trunk of the tree 50 is disconnected therefrom.

The chain 65 is loosened and relased from clamp 66. The strip members 62, 60 and 61 are then easily removed.

The ring 70 of the apparatus A is then moved laterally around the tree 50 so that the hooks 74 may be connected to the members 78 on the segment 75. After a hook 74 has been connected or attached to each of the segments 75 the apparatus A is raised until the container B clars the top ring 11 of the receptacle 9. The apparatus A is then moved to a previously prepared hole for receiving the tree contained with such apparatus A.

As the trailer T is moved across roads, street, and highways, numerous bumps are encountered. As explained above, the weight of the receptacles 9 above the pivot pin 32 is heavier than the weight of the receptacle below the pivot pin 32. This causes the receptacle to seek a horizontal or inverted position. Trees positioned in each of the receptacles 9 will therefore be continuously urged downwardly from an original vertical or upright position to an inclined or substantially horizontal position. The tree in the lowermost receptacle 9 is thus urged into contact with the tree support rest 40, the tree in the center receptacle is urged into contact with the portion 11a of the ring 11 of the lowermost receptacle 9, and the tree in the uppermost receptacle 9 is urged into contact with the portion 11a of the ring 11 of the middle receptacle 9. This downward action results in the trunk of each of the trees being firmly held against the tree support rest 40 or the portions 11a of the ring 11, as applicable. The trees are inhibited from bouncing up and down as bumps are encountered during transporting operations and consequently the trunks of the trees are protected from injury which might otherwise result therefrom.

As can easily be seen the device of the present invention is particularly suited for transporting several trees from one location to another, and even when such locations are relatively far apart. It can be appreciated that the trailer T is also suitable for transporting trees which have been balled or burlapped in a manner well known in the art.

Although the present invention has been presented as a trailer or tree float for illustrative purposes, it is not intended that the scope of the invention be limited to such. For example, the device of the present invention could easily be installed on a truck bed, railroad car, sled or other movable support members.

The size of the trailer T and the receptacles 9 may be varied as desired, generally being governed by applicable local laws and the size of the trees to be transported or moved. The number of receptacles 9 and their specific arrangement may also be varied without departing from the scope of the invention. On any one trailer or tree float it is not necessary that each of the receptacles 9 thereon be of the same size and shape, but it is preferable that they be uniform.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An apparatus for moving trees or similar objects including a frame, a substantially rigid receptacle on said frame adapted for receiving a section of each cut below the trunk of a tree, pivot means on said frame for pivotally connecting said receptacle on said frame, the weight of said rigid receptacle above the pivot point of said pivot means being greater than the weight of said receptacle below the pivot point of said pivot means thereby causing said receptacle to seek a bottoms-up position, said pivot means being connected to said frame and said receptacle so as to substantially limit the movement of said receptacle to a pivoting movement about the pivot point of said pivot means, and lock means on said frame for locking said receptacle in a normally upright position.

2. An apparatus for moving a plurality of trees, sections of earth cut from beneath the trunks thereof, and the roots contained therein including a frame, wheels on said frame, a plurality of receptacles on said frame, each being adapted to receive a root-ball of a tree, each of said receptacles aligned longitudinally on said frame in a stair-stepped relationship, pivot means on said frame for pivotally connecting each of said receptacles on said frame whereby each of said receptacles may be rotated from a substantially vertical to a substantially horizontal position and return.

3. The structure recited in claim 2, including lock means on said frame for locking each of said receptacles in substantially an upright position for receiving the root-balls of trees.

4. The structure recited in claim 2 including retaining means on each of said receptacles for holding the contents of each of said receptacles in said receptacles when said receptacles have been rotated from their upright position.

5. The structure recited in claim 2 wherein each of said receptacles includes an upper ring, a lower ring of relatively smaller diameter than said upper ring, and a plurality of longitudinal members connecting said upper ring and said lower ring to each other.

6. The structure recited in claim 2 wherein each of said receptacles includes an upper ring, a lower ring of relatively smaller diameter than said upper ring, a plurality of longitudinal members connecting said upper ring and said lower ring to each other, and said longitudinal members being spaced equidistantly apart and the width of each of said longitudinal members being substantially smaller than the space between each of said longitudinal members.

7. An apparatus for moving trees and the root-balls thereof, including a frame, a plurality of receptacles on said frame, each being adapted to receive a root-ball of a tree, said receptacles aligned longitudinally on said frame in a stair-stepped spaced apart relationship, pivot means on said receptacles for pivotally connecting said receptacles to said frame, and lock means on said frame for locking each of said receptacles in substantially an upright position for receiving the root-balls of trees.

8. The structure recited in claim 7 including retaining means on each of said receptacles for holding the contents of each of said receptacles in said receptacles when said receptacles have been moved from an upright position.

References Cited in the file of this patent
UNITED STATES PATENTS

| | | |
|---|---|---|
| 717,134 | Street | Dec. 30, 1902 |
| 1,624,504 | Pfarr | Apr. 12, 1927 |
| 1,643,141 | Wadley | Sept. 20, 1927 |
| 1,976,160 | Coplen | Oct. 9, 1934 |
| 2,105,353 | Irish | Jan. 11, 1938 |
| 2,192,771 | Hoffer | Mar. 5, 1940 |
| 2,208,262 | Jeffrey | July 16, 1940 |
| 2,849,125 | Beseler | Aug. 26, 1958 |